Patented Aug. 6, 1929.

1,723,458

UNITED STATES PATENT OFFICE.

MARTIN LUTHER AND KURT PIEROH, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY.

RECOVERY OF DEHYDROGENATION PRODUCTS.

No Drawing. Application filed November 23, 1926, Serial No. 150,372, and in Germany November 27, 1925.

In the catalytic dehydrogenation of higher aliphatic alcohols, by which expression we mean propyl and higher alcohols, to aldehydes or ketones, a serious objection has hitherto arisen from the fact that even after the separation of the resulting aldehydes or ketones in the usual manner from the hydrogen liberated during the reaction, the latter still contains a considerable quantity of these dehydrogenation products on account of their low boiling point. In order to prevent loss of valuable products and to render the hydrogen suitable for other uses, it is necessary to eliminate these volatile products as completely as possible from the hydrogen.

We have now found that a practically complete elimination of the dehydrogenation products from the hydrogen obtained in the dehydrogenating process can be advantageously effected by washing the aldehydes or like products out of the hydrogen with the higher alcohols themselves, which are to be dehydrogenated, cooling being applied as required. Since the vapor tension of the alcohols is substantially lower than that of the dehydrogenation products and, on the other hand, the latter are readily soluble in the alcohols, the hydrogen can be freed from the volatile impurities by this means, in a practically complete manner. The aldehydes or ketones dissolved in the alcohol escape when the mixture is heated, for example when it is vaporized in order to subject the alcohol to dehydrogenation, and can be recovered prior to or after the catalytic treatment in any known or suitable manner.

The following example will further illustrate how this invention may be carried out in practice, but the invention is not limited thereto.

Hydrogen obtained in the dehydrogenation of isobutyl alcohol by treatment with zinc oxid at 420° centigrade is freed from the bulk of aldehyde formed by cooling and then washed in a column with a counterflow of the isobutyl alcohol which is subsequently to be dehydrogenated. The isobutyl alcohol absorbs the isobutyl aldehyde contained in the gas completely, and the said aldehyde (amounting for example to 1 to 2 per cent of the isobutyl alcohol) can be readily recovered for example by evaporting out of the isobbutyl alcohol prior to dehydrogenation. Preferably, the heat of the dehydrogenation products issuing from the dehydrogenating chamber is utilized for warming the alcohol containing the dehydrogenation products. In this way, the aldehydes or ketones of low boiling point are first expelled, and then the alcohol is evaporated for dehydrogenation.

We claim:

1. The process of recovering aldehydes and ketones obtained by the catalytic dehydrogenation of alcohols containing at least three carbon atoms which comprises absorbing the dehydrogenation product from the gas mixture containing it by means of the alcohol to be dehydrogenated.

2. The process of recovering aldehydes and ketones obtained by the catalytic dehydrogenation of alcohols containing at least three carbon atoms which comprises separating the bulk of the dehydrogenation product by cooling and then washing the gas mixture with the alcohol to be dehydrogenated.

3. The process of recovering aldehydes and ketones obtained by the catalytic dehydrogenation of alcohols containing at least three carbon atoms which comprises absorbing the dehydrogenation product from the gas mixture containing it by means of the alcohol to be dehydrogenated and separating it therefrom by distillation.

In testimony whereof we have hereunto set our hands.

MARTIN LUTHER.
KURT PIEROH.